Figure 1:
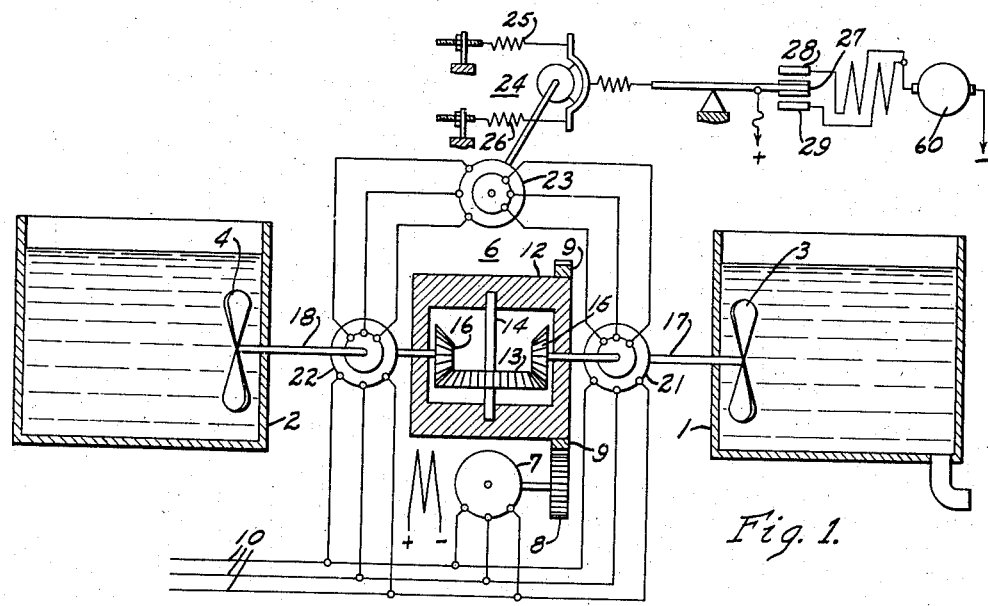

April 28, 1942.  F. H. GULLIKSEN  2,280,947
CONSISTENCY REGULATOR
Filed May 6, 1938  2 Sheets-Sheet 1

WITNESSES:
Leon M. Garman
Nw. C. Groome

INVENTOR
Finn H. Gulliksen.
BY
Paul E. Friedemann
ATTORNEY

April 28, 1942.  F. H. GULLIKSEN  2,280,947
CONSISTENCY REGULATOR
Filed May 6, 1938　　2 Sheets-Sheet 2

WITNESSES:

INVENTOR
Finn H. Gulliksen.
BY
Paul E. Friedmann
ATTORNEY

Patented Apr. 28, 1942

2,280,947

UNITED STATES PATENT OFFICE 2,280,947

CONSISTENCY REGULATOR

Finn H. Gulliksen, Wilkinsburg, Pa., assignor to Westinghouse Electric & Manufacturing Company, East Pittsburgh, Pa., a corporation of Pennsylvania Application May 6, 1938, Serial No. 206,431

5 Claims. (Cl. 265—11)

This invention relates to consistency regulators, and particularly to a system for controlling and maintaining the consistency of a working solution which is depleted during operation and to which a main ingredient must be added during operation to maintain an optimum working condition, such as its consistency.

While my invention may be generally applicable to the control and maintenance of a desired condition in any working solution, I have illustrated it herein principallly as applied to control and to maintain a desired normal consistency in a pulp solution, as a step in the manufacture of paper.

The primary object of my invention, therefore, is to maintain a particular condition, relatively constant, such as the consistency, for example, of a working pulp solution.

Another object of my invention is to provide a control system to regulate the mixing of a pulp solution in order to establish proper consistency, and that shall operate by continuously comparing the consistency of the pulp solution with a standard solution.

In various industrial processes in which a working solution is employed, it is desirable to maintain the consistency of the solution, or some other characteristic of the solution, substantially constant during operation in order to control the characteristics of a product or material that is to be made from, or treated by, the solution.

Particularly in the manufacture of paper, it is desirable to maintain the pulp solution relatively constant, so that the quality of the paper to be manufactured therefrom may be maintained uniform.

In order to maintain the consistency of the working solution constant, I compare a characteristic of that consistency with a definitely constant similar characteristic in another solution. The direction and extent of variation of the working solution from the standard solution can then be measured and utilized to control and to modify, or to change, the working solution to bring it back to the desired normal.

In the consistency regulating system which I disclose herein, I employ as a standard, the application of an artificial resistance of ordinary water to a rotating paddle or propeller against which the resistance of the working solution similarly applied to a paddle may be measured. The artificial resistance of the water to the rotating propeller or paddle, to establish a resistance or frictional characteristic corresponding to a higher resistance of the greater consistency of the working solution, is established in the plain water solution by means of baffles suitably positioned to vary the load upon the propeller that is rotating in the water. A working propeller is also rotated in a quantity of a sample of the working solution. Both propellers are connected either mechanically or electrically to enable them both to be driven through a mechanical or through an electrical connection to assure equal torques on both propellers. Thus, when the resistances of both solutions to the propellers are equal, the two propellers will rotate at substantially the same speeds and there would be no differential effects between their speeds to indicate a difference between the resistances of the two solutions.

When the two propellers rotate at different speeds, assuming the driving torques upon the two propellers are equal or of known differences, then the difference in the speeds of the two propellers may be taken as an indication of the variation or departure of the consistency of the working solution from the desired or standard consistency and such differential value of the two speeds of the propellers may be utilized to control the external mechanism or equipment to bring the consistency of the working solution back to normal.

Figure 2:
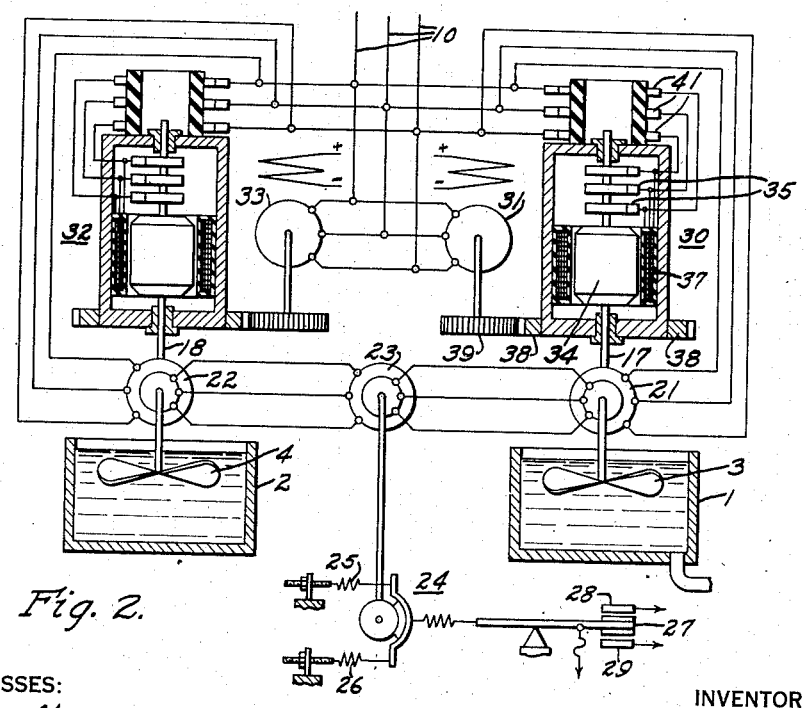
Figure 3:
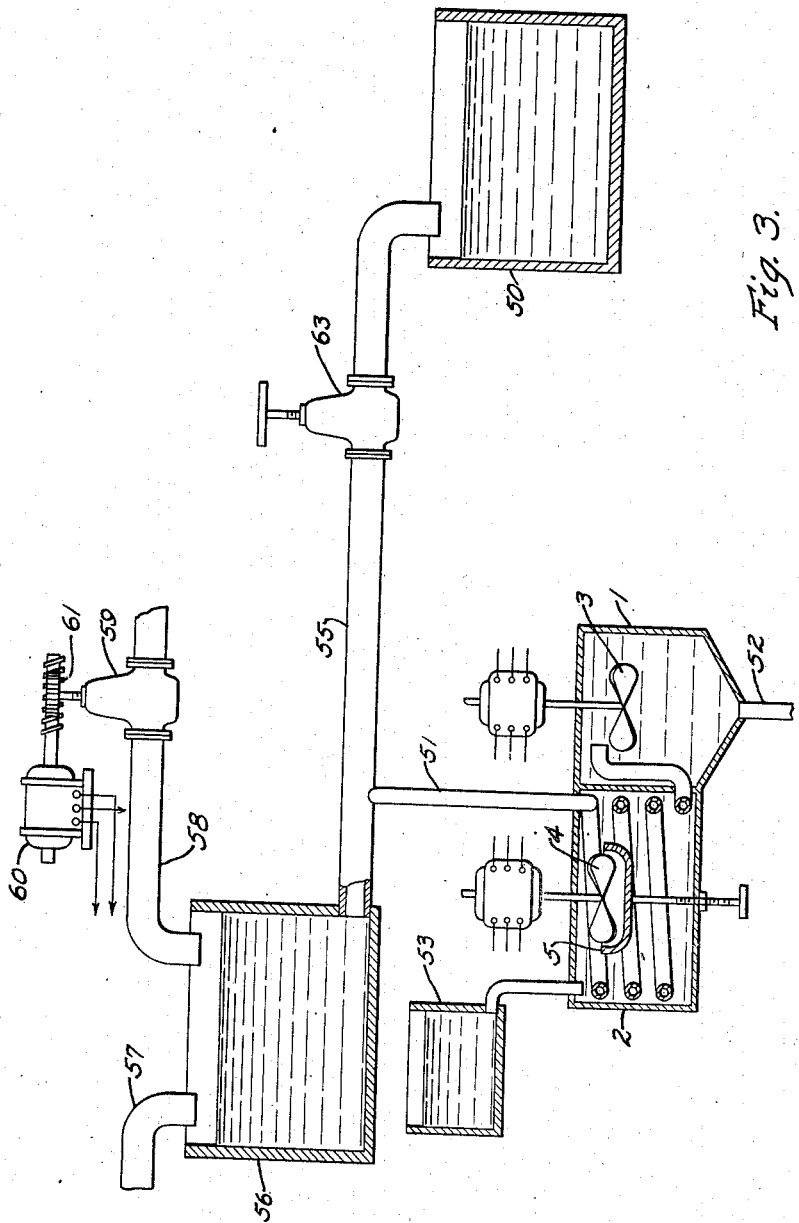

I have illustrated two general schemes for measuring and controlling the consistency of a working solution in the accompanying drawings, in which:

Figure 1 is a simple schematic diagram of a mechanical differential driving system for the two propellers in combination with an electrical detecting and indicating system which may be utilized to control the character of the working solution;

Fig. 2 is a simple schematic diagram of an electrical differential system for driving the propellers, and for detecting a difference in their speeds to control the character of the working solution; and Fig. 3 is a simple schematic diagram illustrating the relative arrangements and disposition of the tank with the standard solution and of the tank with a sample of the working solution, whereby the relative characteristics of the two may be compared.

As shown in Fig. 3, a pulp solution for making paper is formed in a mixing tank 56, into which the beaten pulp is supplied through a pipe 57, and water is supplied through a pipe 58 controlled by a valve 59 operated by a motor 60 and worm 61. The mixed solution is supplied to a main working tank 50 through a main conduit 55, controlled by a manually operable valve 63.

In the arrangement shown in Fig. 3, the propellers are shown directly connected to the driving motors, for the sake of simplicity. The actual connections are shown in Figs. 1 and 2.

For the purpose of this description, the beaten pulp is supplied to the mixing tank 56 and sufficient water is added to establish the proper consistency in the working pulp solution. The addition of the water to the mixing tank 56 is controlled by the motor operated valve 59, according to the consistency of a tested sample of the solution as supplied to the working tank. The pulp solution is to be maintained at a relatively constant predetermined consistency. As an aid in continuously checking the consistency of the working pulp solution as mixed, a by-pass sample, taken from the same point on conduit 55, or points of equal pressure in conduit 55, is continuously passed through a test tank for continuous testing.

In order to provide a standard against which the sample may be tested and measured, another liquid, which may be plain water, is employed in a standard tank 2. The consistency or resistance of the solution of the sample in test tank 1, to a rotating propeller 3, is checked against, and compared with, the corresponding resistance of the water in standard tank 2 to the rotation of a similar propeller 4 in that tank 2.

In order to provide for adjustable resistance to the propeller 4 in ordinary water, some suitable adjustable device, such as a baffle 5, is located in the standard water tank 2, sufficiently close to the propeller 4 to provide enough increased resistance to the rotation of the propeller 4 to give the water a resistance characteristic corresponding to the resistance characteristic of the working solution when the latter is of the proper consistency. In order to check the relative resistances of the solutions to the propellers 3 and 4, the propellers are arranged to be driven with the same driving torque, but in such manner that they may rotate or operate differentially with respect to each other. Such differential rotation of the two propellers is then measured and utilized as an indication of the difference in resistances to the propellers, which will be a measure of the variation of the consistency of the working solution from the standard consistency, as established by the water solution.

In order to provide such a direct and differential rotation of the two propellers, I provide, in the arrangement shown in Fig. 1, a mechanical differential device 6 through which an equal driving torque is impressed upon the two propellers 3 and 4. The differential device 6 is driven by a synchronous motor 7 through two gears 8 and 9, so that the same torque of the one motor 7 is applied to both propellers 3 and 4. Energy for the motor 7 is derived from a three-phase alternating-current circuit 10.

The differential device 6 is shown schematically as comprising a rotatable cage or housing 12 upon the outside of which the gear 9 for driving the housing is mounted. Within the housing 12 is mounted a differential bevel gear 13 upon a shaft 14 mounted transversely of the main axis of rotation of the housing 12.

Two bevel gears 15 and 16 mesh with the differential gear 13 and are respectively mounted on shafts 17 and 18 that extend to the propellers 3 and 4, respectively. The shaft 17 carries a wound rotor induction motor type generator 21, and the shaft 18 carries a similar wound rotor induction motor type generator 22. The primary windings of the generators 21 and 22 are energized from the three-phase circuit 10. The secondary windings of the generators 21 and 22 are connected, respectively, to the stator and rotor of a similarly wound induction motor 23. The rotor of the motor unit 23 is coupled to a balanced torque unit 24 provided with two differentially acting biasing springs 25 and 26. The torque unit 24, depending upon the direction in which the torque of the motor 23 moves the unit 24, causes the latter to operate a pivotally mounted contact 27 to engage either of two stationary contacts 28 and 29 to energize the circuits of the field windings of motor 60 for controlling the supply of water to the ingredients of the working solution to thus condition that solution.

In operation, the mixing tank should be started with the solution reasonably near the desired consistency. The control equipment is, of course, immediately available to regulate the consistency. The motor 7 rotates the housing 12 of the mechanical differential 6. As the housing 12 rotates, the gear 13 maintains a fixed relation to the bevel pinions 15 and 16, and rotates the bevel pinions 15 and 16 at the same speed so long as the propellers 3 and 4 may be rotated at the same speeds in their respective solutions. While the solutions are equally resistant to the propellers 3 and 4, the two differential bevel pinions 15 and 16 will remain in fixed relation on the gear 13, and will be rotated together with the housing 12 in the same manner as if the two shafts 17 and 18 were fixed to the housing 12.

When the consistency of the working solution changes from normal, however, the resistance to the propeller 3 will be either increased or decreased from the normal resistance, and the gear 15 will rotate at a different speed than the gear 16, since the speeds of these gears will correspond to the speeds of their respective propellers.

The pivoted arm carrying contact 27 will function as a position indicator for the system in which the two secondaries of generators 21 and 22 are connected to the two windings of motor 23. So long as the two propellers 3 and 4 rotate at the same speed, the two generators 21 and 22 will also operate at the same speed, and since they are connected to the same circuit from which the synchronous motor 7 is energized, there will be a definite relation between the speed of the motor 7, the speed of the housing 12 and the positions of the rotors of generators 21 and 22, while those two generators are driven at the same speed. Under those conditions, the two windings of motor 23 will be energized by in-phase voltages, and there will be no resultant torque tending to operate contact 27 and this contact 27 will, therefore, remain in normal neutral position.

When the sample from the working solution varies from normal consistency and the speeds of the two propellers 3 and 4 differ, the speeds of the two generators 21 and 22 will correspondingly differ. The energization of motor 23 being a function of the difference in speed of generators 21 and 22 will then cause contact 27 to be displaced from neutral position to engage either contact 28 or 29, to complete one of the external control circuits for controlling the supply of suitable ingredients to the working solution to reestablish proper normal consistency.

In the arrangement that I have shown in Fig. 2, an electrical differential is provided to drive the propellers that is equivalent to the mechanical arrangement shown in Fig. 1. As shown in Fig. 2, the solution in the sample or test tank 1 and the solution in the standard tank 2 are tested by propellers 3 and 4. The propeller 3 is provided with a generator 21, and the propeller 4 is provided with a generator 22 in the same manner as in the mechanical set-up of Fig. 1. A motor 23, responsive to the differential effect of generators 21 and 22, is provided to control a balanced unit 24 and a group of contacts similar to that shown in Fig. 1. The propeller 3 is driven through a torque motor 30 by a synchronous motor 31, and the propeller 4 is driven through a torque motor 32 by a synchronous motor 33.

The torque motor 30 is shown in simple schematic form as consisting of a rotor 34 mounted on the same shaft 17 with the propeller 3. Collector rings 35, with associated brushes, permit energization of the windings of the rotor 34 from the common source of energy 10. The motor 30 further comprises a secondary winding 37 mounted to rotate concentrically about the shaft 17 and the rotor 34. The frame structure for the winding 37 supports a gear 38 which meshes with a gear pinion 39 connected to the motor 31. The frame structure for the winding 37 serves as a support for three collector rings 41 that are suitably engaged by brushes to connect the collector rings and the associated windings to the main supply circuit 10.

The motor 32 on the shaft 18 of the propeller 4 is constructed similar to motor 30. The characteristics of the two motor units 30 and 32 are such as to impart equal driving torques to their respectively associated propellers 3 and 4 from their main driving motors 31 and 33, that also operate at equal speeds.

By means of the torque motors, equal torques may be transmitted to the propellers 3 and 4, while at the same time permitting relatively different speeds and relatively different mechanical positions of the propellers 3 and 4, with respect to each other. The difference in the positions of the propellers 3 and 4, and the differences in their speeds, are detected by the generators 21 and 22 in the same manner as was explained in describing the system of Fig. 1. The differential motor 23 in the tie line also functions in the same way to detect a difference in the speeds of the two rotors, and to operate the contact device 24 to control the external circuits for the same purpose as explained in the description of Fig. 1. By means of the arrangement in Fig. 2, a differential operation of the two propellers may be obtained electrically while supplying equal driving torques to them.

In the arrangement shown in Fig. 3, I have illustrated schematically the manner in which the standard testing solution in the standard tank 2 is conditioned to establish the proper reaction pressure on the propeller 4 to serve as a standard against which the consistency of the working solution in test tank 1 may be measured.

As illustrated, the standard propeller 4 projects into the sample liquid or solution in the test tank 2, and in order to provide a reaction pressure or resistance to the propeller 4 greater than the normal resistance of the standard water solution in the tank 2, an adjustable baffle is disposed adjacent the propeller 4 and the baffle is adjusted until it provides the proper reaction pressure against the propeller at the proper operating temperature. The temperature of the solution in the standard tank 2 is maintained at the same temperature as the sample from working solution in test tank 1 by conducting the sample of the working solution from a main conduit 55 to the main working tank or reservoir 50, through a by-pass conduit 51 into the test tank 1. The conduit 51 is coiled in and submerged in the liquid in the standard tank 2 and thus maintains the liquid in tank 2 at the temperature of the sample solution.

The test tank 1 is provided with an outlet tube 52 to permit the sample or test solution to pass out of the test tank 1 to permit a continuous test to be made of the consistency of the main working solution as supplied to the main working tank 50. A small reservoir 53 of water is connected to the standard tank 2 to replenish losses from evaporation.

By means of the arrangements that I have herein illustrated, a uniform driving torque may be transmitted to two operating propellers, respectively working in a standard solution and in a working solution, while at the same time permitting differential movements between the two propellers in response to different pressure reaction or frictional forces resulting from variations in the consistency of the working solution compared to the standard solution. The variations in the speeds of the two propellers may then be utilized as a detection of a change or variation of the pulp solution from normal consistency, and then further utilized to control external means for reestablishing the desired consistency of the working solution.

My invention is not limited to the specific mechanism that I have illustrated, nor to the specific circuit arrangements that are shown, since the principles which they exemplify may be variously adapted to different structures and circuit arrangements without departing from the spirit and scope of my invention as set forth in the appended claims.

I claim as my invention:

1. A system for measuring the consistency of a pulp solution, comprising means for holding a sample of the solution to be tested, a propeller immersed therein and means for rotating the propeller; means for holding a standard solution, a propeller therein similar to the propeller in the sample solution and rotating means therefor, and adjusting means in the standard solution for adjusting its impeding reaction to the propeller rotation so as to be equivalent to the reaction of the sample solution to its propeller when the consistency of the sample solution is substantially that desired, means for equalizing the torques upon both propellers, means response to a difference in the speeds of the respective propellers in their respective solution.

2. A system for measuring the consistency of a main pulp solution supplied to a working tank from a mixing tank, comprising a standard solution in one receptacle, a propeller immersed therein and means for rotating the propeller, a sample solution drawn from the pulp solution as supplied to the working tank, a receptacle for the sample and means connecting the sample receptacle in a by-pass circuit relation with a portion of the path of the main pulp solution whereby the sample solution may be continuously drawn from the main pulp solution as it is supplied to the working tank, thereby to enable a continuous test to be made of the pulp solution as supplied to the working tank, a propeller extending into the sample receptacle and immersed in the sample solution, means for adjusting the frictional resistance of the standard solution on the propeller in the standard solution to be equal to the frictional resistance of the sample solution on the propeller in the sample solution when the sample solution has the desired correct consistency, means for applying equal rotating torques to both propellers, means responsive to the respective speeds of both propellers, and means controlled by said speed-responsive means for thus comparing the consistency of the working solution with reference to the standard solution.

3. In a testing apparatus for indicating a difference in the consistency of a pulp solution from its desired consistency, comprising, a receptacle through which pulp solution to be tested flows, a propeller in the receptacle, a second receptacle containing a standard solution, a propeller in the second receptacle, a mechanical differential mechanically connected to drive both propellers while providing for relative rotation between them, when the frictional resistances to rotation of the respective solutions on the propellers are different, means for driving the mechanical differential, means for adjusting the frictional resistance of the standard solution on the propeller in the receptacle containing the standard solution to be equal to the frictional resistance of the solution to be tested on the propeller in the receptacle through which the solution to be tested flows when the solution to be tested has the correct, or desired, consistency, a pair of dynamo-electric machines each having primary windings and secondary windings, one of the windings of one machine being mounted to rotate with one propeller shaft and a corresponding one of the windings of the other machine being mounted to rotate with the other propeller shaft, a source of alternating current connected to energize the primary windings of said dynamo-electric machines, means responsive to the difference in frequency of the currents induced in the secondary windings as a result of a difference in speed between the propellers, and means responsive to the last named means for indicating a difference in the consistency of the solution to be tested from its desired consistency.

4. In a testing apparatus for indicating a difference in the consistency of a pulp solution from its desired consistency, comprising, a receptacle through which pulp solution to be tested flows, a propeller in the receptacle, a second receptacle containing a standard solution, a propeller in the second receptacle, a mechanical differential mechanically connected to drive both propellers while providing for relative rotation between them, when the frictional resistances to rotation of the respective solutions on the propellers are different, means for driving the mechanical differential, a pair of dynamo-electric machines each having primary windings and secondary windings, one of the windings of one machine being mounted to rotate with one propeller shaft and a corresponding one of the windings of the other machine being mounted to rotate with the other propeller shaft, a source of alternating current connected to energize the primary windings of said dynamo-electric machines, means responsive to the difference in frequency of the currents induced in the secondary windings as a result of a difference in speed between the propellers, and means responsive to the last named means for indicating a difference in the consistency of the solution to be tested from its desired consistency.

5. A system for indicating a difference in the consistency of a sample pulp solution from its desired consistency as determined by a standard solution, comprising, a receptacle containing a sample of the solution to be tested, a propeller immersed therein, and means for rotating the propeller; a receptacle containing a standard solution, a propeller therein similar to the propeller in the sample solution, and rotating means therefor; means in the receptacle containing the standard solution for adjusting its impeding reaction to the propeller rotation to be equivalent to the impeding reaction of the sample solution to its propeller rotation when the consistency of the sample solution is substantially that desired, and means responsive to the differential reaction of the respective solutions to rotations of their respective propellers for indicating a difference in the consistency of said sample solution from the desired consistency of the sample solution.

FINN H. GULLIKSEN.